(12) United States Patent
Leary

(10) Patent No.: US 8,748,733 B2
(45) Date of Patent: Jun. 10, 2014

(54) SOLAR MODULE INTEGRATION SYSTEM

(75) Inventor: Daniel Patrick Leary, North Andover, MA (US)

(73) Assignee: Panelclaw, Inc., North Andover, MA (US)

( * ) Notice: Subject to any disclaimer, the term of this patent is extended or adjusted under 35 U.S.C. 154(b) by 61 days.

(21) Appl. No.: 12/056,791

(22) Filed: Mar. 27, 2008

(65) Prior Publication Data

US 2009/0242014 A1 Oct. 1, 2009

(51) Int. Cl.
| | | |
|---|---|---|
| *H02N 6/00* | (2006.01) | |
| *H01L 31/042* | (2006.01) | |
| *E04D 13/18* | (2006.01) | |
| *E04H 14/00* | (2006.01) | |

(52) U.S. Cl.
USPC ........................................ 136/251; 52/173.3

(58) Field of Classification Search
USPC .............................. 136/251; 29/428; 52/173.3
See application file for complete search history.

(56) References Cited

U.S. PATENT DOCUMENTS

| | | |
|---|---|---|
| 811,274 A | 1/1906 | Carter |
| 2,971,736 A | 2/1961 | Enneper |
| 4,165,853 A | 8/1979 | Brandt |
| 4,226,256 A | 10/1980 | Hawley |
| 4,336,413 A | 6/1982 | Tourneux |
| 4,371,139 A | 2/1983 | Clark |
| 4,966,631 A | 10/1990 | Matlin et al. |
| 5,125,608 A | 6/1992 | McMaster et al. |
| 5,143,556 A | 9/1992 | Matlin |
| 5,228,924 A | 7/1993 | Barker et al. |
| 5,509,973 A | 4/1996 | Ishikawa et al. |
| 5,524,401 A | 6/1996 | Ishikawa et al. |
| 5,571,338 A | 11/1996 | Kadonome et al. |
| 5,571,339 A | 11/1996 | Ringel et al. |
| 5,603,187 A | 2/1997 | Merrin et al. |

(Continued)

FOREIGN PATENT DOCUMENTS

| | | |
|---|---|---|
| CN | 2435706 | 6/2001 |
| CN | 201401994 | 2/2010 |

(Continued)

OTHER PUBLICATIONS

International Search Report and Written Opinion in corresponding International Application No. PCT/US2009/038496 dated, May 28, 2009.

(Continued)

*Primary Examiner* — Tamir Ayad
(74) *Attorney, Agent, or Firm* — Foley & Lardner LLP; Christopher J. McKenna

(57) ABSTRACT

Embodiments of the present inventions are directed to systems, devices for use with systems, and method of mounting and retaining solar panels. A solar module mounting system may include a ballast, a sole mechanically coupled to a bottom surface of the ballast, a link member embedded in the ballast, an attachment module mechanically coupled to the link member, and a deflector mechanically coupled to the link member. A method of mounting a solar panel module may include forming a link member and a ballast, attaching the ballast to the link member, bonding a sole to a lower surface of the ballast and/or the link member, attaching a solar panel module to the link member with an attachment module member, electrically grounding the mounting system, routing a wiring from the solar panel module through a wire chase, and attaching a deflector module to the link member.

27 Claims, 13 Drawing Sheets

(56) References Cited

U.S. PATENT DOCUMENTS

| | | | |
|---|---|---|---|
| 5,706,617 A | 1/1998 | Hirai et al. | |
| 5,740,996 A | 4/1998 | Genschorek | |
| 5,746,839 A | 5/1998 | Dinwoodie | |
| 5,890,333 A * | 4/1999 | Boroviak | 52/292 |
| 6,061,978 A | 5/2000 | Dinwoodie et al. | |
| 6,148,570 A | 11/2000 | Dinwoodie et al. | |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,570,084 B2 | 5/2003 | Dinwoodie | |
| 6,617,507 B2 | 9/2003 | Mapes et al. | |
| 6,722,357 B2 | 4/2004 | Shingleton | |
| 6,730,841 B2 | 5/2004 | Heckeroth | |
| 6,784,360 B2 | 8/2004 | Nakajima et al. | |
| 6,809,251 B2 | 10/2004 | Dinwoodie | |
| 6,809,253 B2 | 10/2004 | Dinwoodie | |
| 6,856,496 B1 | 2/2005 | Mucci et al. | |
| 6,883,290 B2 | 4/2005 | Dinwoodie | |
| 6,959,517 B2 | 11/2005 | Poddany et al. | |
| 6,967,278 B2 | 11/2005 | Hatsukaiwa et al. | |
| 6,968,654 B2 | 11/2005 | Moulder et al. | |
| 7,012,188 B2 | 3/2006 | Erling | |
| 7,178,295 B2 | 2/2007 | Dinwoodie | |
| 7,260,918 B2 | 8/2007 | Liebendorfer | |
| 7,297,866 B2 | 11/2007 | Aschenbrenner | |
| 7,554,030 B2 | 6/2009 | Shingleton | |
| 8,101,849 B2 | 1/2012 | Almy et al. | |
| 8,272,176 B2 | 9/2012 | Wallgren | |
| 2003/0010375 A1 | 1/2003 | Dinwoodie | |
| 2003/0015636 A1 | 1/2003 | Liebendorfer | |
| 2004/0007260 A1 | 1/2004 | Dinwoodie | |
| 2004/0163338 A1 | 8/2004 | Liebendorfer | |
| 2005/0126621 A1 | 6/2005 | Dinwoodie et al. | |
| 2005/0144870 A1 | 7/2005 | Dinwoodie | |
| 2005/0229924 A1 | 10/2005 | Luconi et al. | |
| 2005/0257453 A1 | 11/2005 | Cinnamon | |
| 2006/0118163 A1* | 6/2006 | Plaisted et al. | 136/251 |
| 2007/0144575 A1 | 6/2007 | Mascolo et al. | |
| 2007/0151594 A1 | 7/2007 | Mascolo et al. | |
| 2007/0212935 A1 | 9/2007 | Lenox | |
| 2008/0230047 A1 | 9/2008 | Shugar et al. | |
| 2009/0151775 A1 | 6/2009 | Pietrzak | |
| 2010/0077679 A1 | 4/2010 | Sagayama | |
| 2010/0243023 A1 | 9/2010 | Patton et al. | |
| 2010/0269888 A1 | 10/2010 | Johnston, Jr. | |
| 2012/0192422 A1 | 8/2012 | Lucas et al. | |
| 2012/0216464 A1 | 8/2012 | Bonapace | |

FOREIGN PATENT DOCUMENTS

| | | |
|---|---|---|
| DE | 27 58 067 | 7/1979 |
| DE | 79 13 751 | 8/1982 |
| DE | 203 04 099 | 7/2003 |
| DE | 1020050 12 054 | 3/2005 |
| EP | 0 344 523 | 12/1989 |
| JP | 2002-115374 a | 4/2002 |
| JP | 2003-008046 A | 1/2003 |
| JP | 2003-184235 a | 7/2003 |
| JP | 2005-064147 | 3/2005 |
| KR | 100915679 B1 | 9/2009 |
| WO | WO-90/12990 A1 | 11/1990 |
| WO | WO-94/00650 | 1/1994 |
| WO | WO-2009/013607 | 1/2009 |
| WO | WO-2009/120923 A2 | 10/2009 |
| WO | WO-2011/014655 A2 | 2/2011 |

OTHER PUBLICATIONS

International Preliminary Report on Patentability for PCT/US2010/043712 Dtd Jan. 31, 2012.

International Search Report and Written Opinion in corresponding International Application No. PCT/US2009/038496 dated May 28, 2009.

International Search Report for PCT/US2010/043712 Dtd Oct. 6, 2011.

International Search Report for PCT/US2011/045773 dated Jul. 13, 2012.

MX Office Action dated Mar. 7, 2012.

"PV Specifications" http://www.pearen.ca/Reference/pv_specs.htm (2001) retrieved on Dec. 4, 2013.

Adrian Radu, et al., "Steady Wind Pressures on Solar Collectors on Flat-Roofed Buildings," Journal of Wind Engineering and Industrial Aerodynamics, 23 (1986) 249-258.

B. Bienkiewicz et al., "Wind Effects on Roof Ballast Pavers," Journal of Structural Division American Society of Civil Engineering Jun. 1987 (34 pages).

Chevalier, H.L. and Norton, D.J.; Wind Loads on Solar-Collector Panels and Support Structure; Texas A&M University-Aerospace Engineering Department; Oct. 1979.

Cochran, Leighton S.; Influence of Porosity on the Mean and Peak Wind Loads for Three Concentrator Photovoltaic Arrays; Thesis for the Degree of Master of Science Colorado State University; Fall 1986.

Delmarva Power & Light Company, "Development of a Dispatchable PV Peak Shaving System," Prepared for the US Department of Energy, Oct. 1995.

Development of a Flat Roof Integrated Photovoltaic System (SOFREL); Phase 1 Report of the SOFREL R&D project; Mar. 1994.

Edward C. Kern, Jr., et al., "Rotating Shadow Band Pyranometer Irradiance Monitoring for Photovoltaic Generation Estimation," Twenty-second IEEE Photovoltaic Specialist Conference—1991.

Farrington, Robert; Building Integrated Photovoltaics; National Renewable Energy Laboratory Technical Monitor; Jan. 1993.

Fuentes, Martin K.; A Simplified Thermal Model for Flat-Plate Photovoltaic Arrays; Sandia Report, May 1987.

H.W. Tielman, et al., "An Investigation of Wind Loads on Solar Collectors," Virginia Polytechnic Institute and State University, Blackburg, VA, 1989.

Installation Guide for the Siemens Solar Industries M55/M75/M65/M20/M45/M40/M35 Solar Electric Modules, 1990.

Kern, Jr., Edward C.; Low-cost PV Array Mounting for Flat-Roof Buildings; Third International Workshop on Photovoltaics in Buildings, Sep. 1994.

L.M. Murphy, "Wind Loading on Tracking and Field Mounted Solar Collectors," Solar Energy Research Institute, prepared for US Department of Energy, Dec. 1980.

Lisa Frantzis, et al., "Building-Integrated Photovoltaics (BIPV): Analysis and US Market Potential," Report to US Department of Energy Office of Building Technologies, Feb. 1995.

M.C. Russell, "Solar Photovoltaic Systems for Residences in the Northeast," Prepared for the US Department of Energy, 1980.

Miles C. Russell, et al., "Stand-Off Building Block Systems for Roof-Mounted Photovoltaic Arrays," Sandia National Laboratories, SAND85-7020, Jun. 1986.

International Preliminary Report on Patentability for PCT/US2011/045773 dated Jan. 29, 2013.

Peterka, J.A. et al.; Mean Wind Forces on Parabolic-Trough Solar Collectors; Sandia National Laboratories—Colorado State University; May 1980.

Report to US Department of Energy Office Building Technologies: Building Integrated Photovoltaics (BIVP)—Analysis and US Market Potential; Feb. 1995.

Russell Miles C. and Kern, Jr., Edward C.; PV Array Designed for Flat-Roof Buildings; 1993 IEEE.

S. Bhaduri et al., "Wind Loading on Solar Collectors," SERI, Jun. 1985.

Second Office Action issued Jan. 30, 2013, in Chinese Patent Application No. 200980119302.8.

Solar Energy Research Institute, "Photovoltaics for Residential Applications," SERI, Feb. 1994.

Stafford, Byron; Design Considerations and Performance of Maspeth a-Si PV System; 1994 American Institute of Physics.

US Office Action on U.S. Appl. No. 12/846,259 DTD Aug. 19, 2013.

US Office Action on U.S. Appl. No. 12/846,259 DTD Nov. 6, 2012.

American Society of Civil Engineers, "Minimum Design Loads for Buildings and Other Structures," ANSI/ASCE 7-95, approved Jun. 6, 1996.

* cited by examiner

SOLAR MODULE INTEGRATION SYSTEM

BACKGROUND OF INVENTION

1. Field of Invention

Embodiments of the present inventions are directed to systems, devices for use with systems, and method of mounting and retaining solar panels.

2. Discussion of Related Art

Solar (photovoltaic) panels are often manufactured in the form of flat rigid structures. To facilitate the performance of the function of generating electricity, solar panels may be mounted in an area exposed to the sun or other source of light. Often, it is desirable to mount solar panels outdoors at an angle from the horizontal so that they will more directly face the sun during peak daylight hours as opposed to panels mounted flat on the ground. In some applications, it may be desirable to mount a number of solar panels together in an array in order to combine the power generation capabilities of the individual panels. In many instances, it may be desirable that mounting systems for solar panel arrays retain the solar panels in place. This may be accomplished by attaching the solar panels to one another in a mounting system and/or by mounting the panels to the mounting system.

For example, U.S. Patent Application Publication No. 2007/0133474 to Mascolo et al. describes a supported solar panel assembly including a solar panel module comprising a solar panel and solar panel module supports including module supports having support surfaces supporting the module, a module registration member engaging the solar panel module to position the solar panel module on the module support, and a mounting element. U.S. Pat. No. 6,534,703 to Dinwoodie describes a solar panel assembly for use on a support surface comprising a base, a solar panel module, a multi-position module support assembly, and a deflector.

SUMMARY OF INVENTIONS

According to one aspect of the current inventions there is provided a solar module mounting system. The solar module mounting system comprises a ballast, a sole mechanically coupled to a bottom surface of the ballast, a link member embedded in the ballast, an attachment module mechanically coupled to the link member, and a deflector mechanically coupled to the link member.

According to another aspect of the current inventions there is provided a solar module mounting system component. The solar module mounting system component comprises a ballast and a link member embedded in the ballast. The link member is adapted for coupling to a solar panel module.

According to another aspect of the current inventions there is provided a link member for a solar module mounting system. The link member comprises a first portion including a first facility for attaching to a solar panel module, a second portion including a second facility for attaching to a second portion of a solar panel module, and a third portion adapted to receive and substantially carry the weight of a first ballast.

According to another aspect of the current inventions there is provided a link member for a solar module mounting system. The link member comprises a first surface including a first facility for attaching to a first portion of a solar panel module, a second surface coupled to the first surface including a second facility for attaching to a second portion of a solar panel module, and a grounding facility.

According to another aspect of the current inventions there is provided an attachment module for a solar module mounting system. The attachment module comprises a first section with a first surface a second section with a second surface. A second section is coupled to the first section. The first surface is spaced from the second surface. The second section defines a threaded hole. The attachment module further comprises a fastener for retaining a portion of a solar panel module between the first surface and the second surface.

According to another aspect of the current inventions there is provided a solar module mounting system. The solar module mounting system comprises a ballast, a link member comprising a ballast platform onto which the ballast is fixedly mounted, an attachment module mechanically coupled to the link member, and a deflector mechanically coupled to the link member.

According to another aspect of the current inventions there is provided a solar module array. The solar module array comprises a plurality of solar module mounting elements. The solar module mounting elements comprises a ballast, a link member mechanically coupled to the ballast, an attachment module mechanically coupled to the link member, and a deflector mechanically coupled to the link member. A solar panel module is mechanically coupled to the plurality of solar module mounting elements.

According to a further aspect of the current inventions there is provided a method of forming a shoe of a solar module mounting system. The method comprises forming a link member from a metal sheet by cutting, bending, and galvanizing the metal sheet, inserting the link member into a mold, pouring concrete into the mold and about the link member, thereby forming a ballast with an embedded link member; and mechanically fixing a sole to a bottom surface of the ballast.

According to a further aspect of the current inventions there is provided a method of mounting a solar panel module. The method comprises forming a link member, forming a ballast, attaching the ballast to the link member, bonding a sole to a lower surface of at least one of the ballast and the link member, attaching a solar panel module to the link member with an attachment module member routing a wiring from the solar panel module through the at least one wire chase, and attaching a deflector module to the link member.

According to a further aspect of the current inventions there is provided a method of installing a solar panel array. The method comprises acts of providing a solar panel, coupling an attachment module to the solar panel, after coupling the attachment module to the solar panel, coupling the attachment module to a support member.

According to a further aspect of the current inventions there is provided a method of installing a solar panel array. The method comprises acts of providing a support mechanism, providing a solar panel, selecting a height on the solar panel for attaching the panel, and attaching the panel at the selected height.

According to a further aspect of the current inventions there is provided a support mechanism for a solar panel to be installed on a roof. The support mechanism comprises a ballast, a link member in contact with the ballast so that the link member and ballast are maintained in a secure relationship, and a sole to protect the roof from damage from the linking member and ballast

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
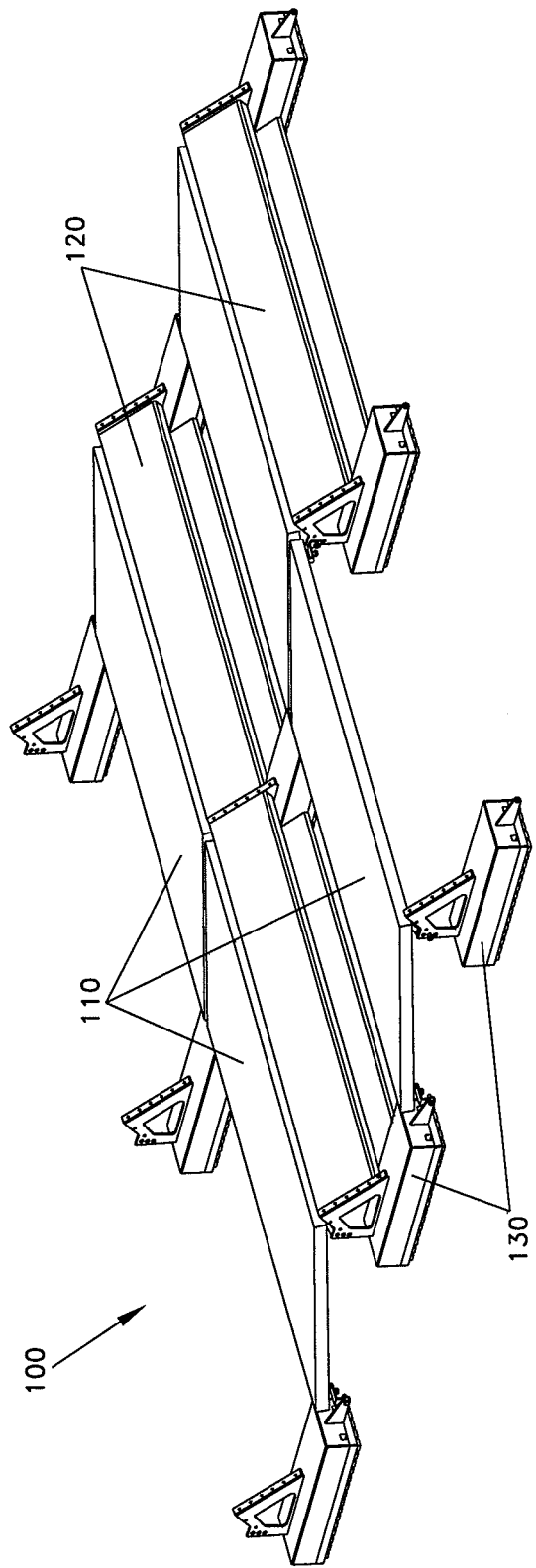
FIG. 1 is an array of solar panel modules according to an aspect of the present inventions.

This inventions described herein are not limited to the details of construction and the arrangement of components set forth in the following description or illustrated in the drawings. The inventions are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The description of one aspect of the inventions disclosed herein is not intended to be limiting with respect to other aspects of the present inventions.

FIG. 1 illustrates an example of a section of an array of solar panel modules 100 according to an aspect of the present inventions that may be deployed on, for example, a large flat roof as may be found on large commercial buildings; aspects of the present invention may be applied to other roof structures and other mounting surfaces.

The array 100 in this example includes a plurality of solar panel modules 110. The solar panel modules 110 are illustrated in FIG. 1 as being mounted at an angle from the horizontal, but in some embodiments, the solar panel modules may be mounted at angles other than that illustrated in FIG. 1 or even horizontally. The solar panel modules 110 may in some embodiments be mounted at different angles throughout the array 100 and uniformly in others such as the one shown in FIG. 1. The array 100 also includes a plurality of deflector elements 120. These deflector elements 120 are located in FIG. 1 facing what will be described herein as the Top side of array 100. What is described as the Top side may correspond to geographical North position of the array. As shown here, the Top side may be positioned approximately to the North so that the tilted faces of the panel modules are directed generally toward the South, e.g., tilted to more squarely face the direction of the sun for an installation north of the equator. In some embodiments, each solar panel module 110 may have a corresponding deflector element 120, but in some embodiments, at least one of the solar panel modules 110 in an array 100 may not have an accompanying deflector element 120. For example, in one embodiment, deflectors are positioned only on panel modules at the Top edge of the array. In some embodiments, additional deflector elements (not shown) may be mounted facing the lateral sides (i.e., the sides perpendicular to the Top side) at the edges of the array, roughly perpendicular to the deflector elements 120 illustrated in FIG. 1. In another embodiment, deflectors are positioned only on the Top and side edges of the array.

The deflector elements 120 and solar panel modules 110 in this example are mounted on shoes 130. A shoe is a support structure that may be used to support at least a portion of a solar panel; in this example, the show is used to support a corner of a solar panel, and in this example, can be used to support up to four corners of the panel. An example of shoes is described more fully below with respect to FIG. 3.

Figure 2:
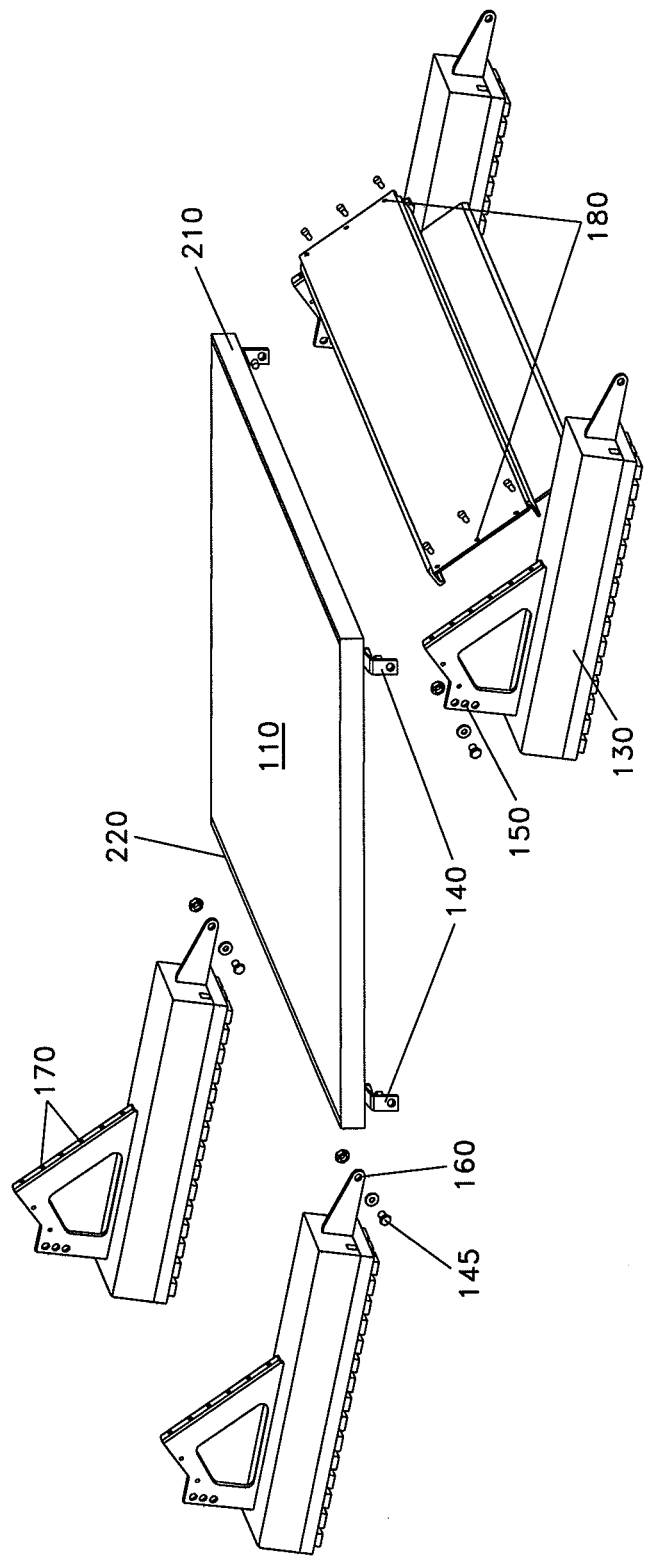
FIG. 2 is an exploded view of a section of a solar module mounting system according to an aspect of the present inventions.

FIG. 2 is an exploded view of one section of the array 100 in the example of FIG. 1. FIG. 2 illustrates one embodiment of attachment module 140 according to one aspect of the present inventions, mounted proximate the corners of solar panel module 110. In this example the attachment modules 140 may be made of a metal such as aluminum. In some embodiments, the attachment modules 140 may be made of a conductive material to assist in grounding of the panel modules or may include a grounding path.

In this example, attachment module 140 includes an attachment mechanism which is this example is a threaded hole for a bolt which may be used to attach the attachment modules 140 to a solar panel module 110. The attachment module 140 may also include second, non-threaded holes for bolts 145 that may used to attach (or facilitate attaching) an attachment module 140 to a shoe 130. Other attachment mechanisms may be employed with attachment modules 140, including, for example, screws, adhesives, clips, or solder. Since many commercially available solar panels include a similar edge, this particular attachment module is compatible for use with solar panels provided by multiple suppliers. This particular attachment module is also compatible for use with solar panel mounting systems provided by multiple suppliers. Other designs for compatibility with multiple suppliers may be provided based on the disclosure provided herein and different attachment modules may be designed for use with different solar panels but made compatible for use with a common shoe configuration.

In this example, the shoe 130 includes a facility to permit attachment of panels to the shoe. In this example, rear mounting holes 150 are provided on the upper rear portion of shoe 130 and provide locations for the attachment of attachment modules 140. In some embodiments, an attachment module 140 mounted to shoe 130 through rear mounting holes 150 may be attached to a solar panel module 110 proximate a Top edge 210 of the solar panel module 110 that is vertically higher than a Bottom edge 220 of the solar panel module when the solar panel module 110 is mounted on some embodiments of certain aspects of the present inventions. The Bottom edge 220 of solar panel module 110 may be attached with another attachment module 140 to a forward mounting hole 160 on another shoe 130.

In the embodiment of FIG. 2, the mechanism that assists in attachment of panel module 110 to shoes 130 includes a link (this example of a link element being described more fully below) that allows attachment of panel in more than one location. In this example, a plurality of rear mounting holes 150 are provided on shoes 130 (rather than a single hole, for example). This allows for the system according to some embodiments to accommodate fluctuations in the height of a roof or other surface upon which the system may be mounted and/or for mounting panels at different angles. In this example, shoes 130 may include three rear mounting holes 150 spaced 0.75 inches vertically apart from one another, which allows the system to accommodate up to five degree undulations in a roof or other mounting surface upon which it may be mounted. Other mechanisms may be employed in other embodiments to facilitate attachment of panel to shoe and those embodiments may (or may not) provide flexibility in ability to vary the height of attachment with respect to the shoe either by allowing multiple attachment points as in this example or by allowing slidable adjustment, as would be readily designed by one of skill in the art based on the disclosure provided herein.

As further illustrated in FIG. 2, shoes 130 may also include a mechanism to assist in mounting a deflector 120. In this example, the mounting mechanism includes deflector mounting holes 170 on shoes 130. Deflector 120 may be attached to shoes 130 by fasteners passing through holes 180 in the edge of deflector 120 and deflector mounting holes 170 of shoes 130.

Figure 3:
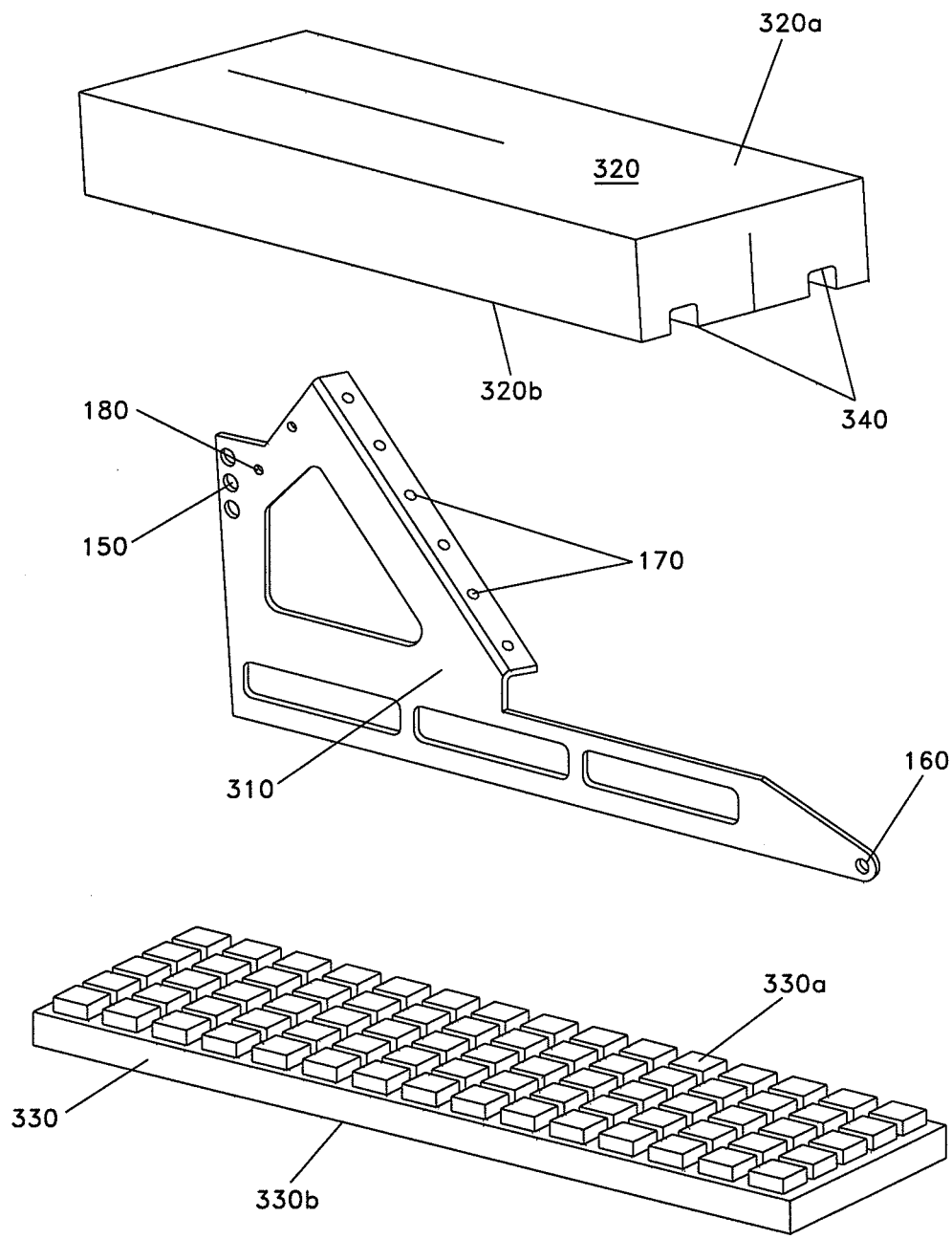
FIG. 3 is an exploded view of a shoe element of FIG. 2.

FIG. 3 illustrates in more detail an example of a shoe 130 according to an aspect of the present inventions. In FIG. 3, the shoe 130 is illustrated in an exploded view. In this example, the shoe 130 comprises three sub-elements: a link 310, a ballast 320, and a sole 330.

Link 130 provides an attachment mechanism for attachment module 140. Link 130 may comprise three sets of mounting holes.

Rear mounting holes 150 may be used to mount an attachment module 140 for attachment to a Top end of a solar panel module 110 to shoe 130. In some embodiments, there may be three of rear mounting holes 150, and in some embodiments there may be a greater or lesser number of rear mounting holes 150 or some other mechanism to facilitate attachment.

In this example, a facility for attaching a solar panel module to a shoe at the bottom edge of the solar panel module is also provided. In this embodiment, forward mounting hole 160 may be used to mount an attachment module 140 for attachment to a Bottom end of a solar panel module 110 to shoe 130. In some embodiments, there may be more than one forward mounting hole 160, or another attachment mechanism may be employed. This may provide greater flexibility of mounting options, for example, to allow a user to select an upper or a lower forward mounting hole 160 to compensate for variations in height of a surface upon which shoe 130 may be mounted.

In this example, the link also includes a mechanism to facilitate attachment of deflectors. In this embodiment, deflector mounting holes 170 may be used to attach a deflector 120 to shoe 130. A plurality of mounting holes 170 may be provided in shoe 130. This may allow for flexibility in the positioning of deflector 120 on shoe 130.

In some embodiments, an integrated grounding attachment 180 may be provided in link 310. Integrated grounding attachment 180 may be in the form of a hole to which a grounding wire of a solar panel module 110 may be attached, or may be an eyelet or other grounding attachment mechanism to assist in providing an electrical connection to ground from panel to panel.

In the embodiment according to FIG. 3, ballast 320 provides shoe 130 with mass that may assist in keeping array 100 securely in place on a roof or other surface. Ballast 320 may also contain one or more wire chases 340 that can be used for running electrical wire through the shoe 130. Wire chases 340 provide shoe 130 with integrated wire management and integrated grounding capabilities. These wire chases 340 may be molded or cut into the ballast 320, or may be formed by casting, for example, ½" diameter (or greater) pieces of PVC pipe or other material into ballast 320 during the manufacture thereof. In other embodiments, a facility for passing wires may be integrated elsewhere in the shoe, such as in the sole or on top of the ballast.

In this example, sole 330 may provide friction to keep array 100 securely in position on a roof or other mounting surface and/or may be configured to help protect the roof or other mounting surface from damage from ballast 320 and/or permit water to pass under it. Sole 330 may comprise a patterned bottom surface 330b which may enhance the friction of sole 330 against a mounting surface. The bottom surface 330b of sole 330 may have a basic waffle cut pattern. Other patterns (or no pattern) may be employed in other embodiments. Sole 330 may also have a patterned upper surface 330a which may facilitate attachment of sole 330 to ballast 320, as will be explained in more detail below. The upper surface 330a of sole in the embodiment illustrated in FIG. 3 has a basic waffle cut pattern. Other patterns (or no pattern) may be employed in other embodiments. Sole 330 may be joined to ballast 320 at upper surface 330a using a suitable adhesive such as epoxy, although other attachment mechanisms would be readily apparent to one of skill in the art based on the disclosure provided herein.

Ballast 320 is illustrated in FIG. 3 with a slot into which link 310 may be mounted. In some embodiments, link 310 may be inserted into ballast 320 after both elements are formed, and in other embodiments, ballast 320 may be cast or molded about link 310.

Ballast 320 may in some embodiments be made from a concrete mix. Ballast 320 in some embodiments may be made from any concrete mix that is intended to withstand the elements for an appropriate period of time, such as cement intended for outdoor applications and having an intended life span of 30+ years. Ballast 320 may in some embodiments be made using a Portland Type III concrete with air entrainment of about 5%. This concrete is a high early strength, normal weight concrete with a fully cured strength of 5,000 psi, and is available from Precast Specialties Inc. of Abington, Mass. Alternatively, ballast 320 may be formed from materials such as, for example, metal, natural or recycled rubber, or Quazite®, a polymer concrete available from Hubbell Lenoir City, Inc. of Lenoir City, Tenn., or other materials.

Link 310 can be made from metals such as stainless steel, mild steel, aluminum, UV resistant plastic, fiberglass, concrete, or other materials. In some embodiments, link 310 may be made from 0.075 inch thick cold rolled mild steel. The mild steel may be cut, bent into the shape of link 310, and then hot-dip galvanized. Where a conductive material is used, the link may be used to assist in passing an electrical ground connection among panels.

In some embodiments, sole 330 may be made from any material that can be considered an "inert pad" by the roofing industry. In some embodiments, sole 330 may be made from recycled, non-vulcanized crumb rubber, such as that available from Unity Creations Ltd. of Hicksville, N.Y. In other embodiments sole 330 may be made from natural rubber, EPDM (Ethylene Propylene Diene Monomer—a rubber roofing material), or another roofing material that may protect the roof or other surface upon which array 100 may be mounted from damage by the material of ballast 320. Sole 330 may be adhered to ballast 320 using an adhesive, such as, for example, epoxy. In some embodiments, an epoxy known as ChemRex 948 may be used. In other embodiments, sole 330 may comprise a rubber pad cast directly into ballast 320. Sole 330 may be cast directly into ballast 320 by for example, providing sole 330 with rubber teeth and/or with pits or inclusions. Concrete, or other material from which a ballast 320 may be formed, could be poured onto sole 330 on the side with the rubber teeth and/or pits or inclusions, and the teeth will mold into the concrete or other material and be bonded to it, and/or the concrete or other material will fill the pits or inclusions and thereby bond to the sole 330. Sole 330 may additionally or alternatively be secured to ballast 320 by a fastener or fasteners such as, for example, screws or bolts.

Figure 4:
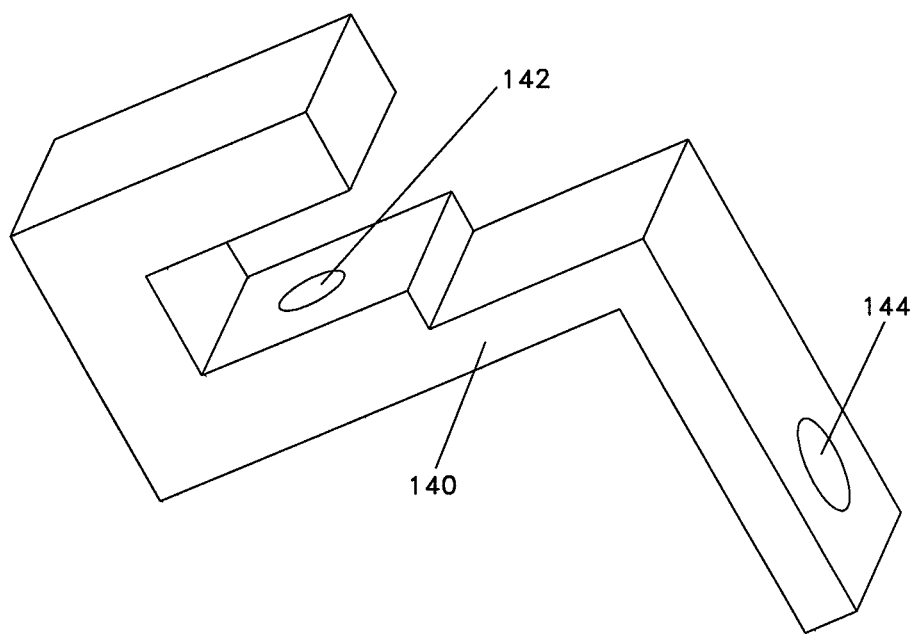
FIG. 4 is an attachment module of a solar module mounting system according to an aspect of the present inventions.

FIG. 4 is an enlarged view of attachment module 140. Attachment module 140 may in some embodiments be made from 6061-T6 aluminum which can be anodized if desired. The attachment module 140 can also be made from other metal or some other material of sufficient strength. Where a conductive material is selected, the attachment module may be used to assist in passing ground among panels.

The attachment module may be formed by machine cutting, but can also be extruded, laser cut, or water jet cut or formed using another suitable manufacturing method.

In one embodiment, attachment module 140 is configured to permit it to be attached to a plurality of different panel modules and/or panel module mounting systems available in the market.

Attachment module 140 may in some embodiments include a threaded hole 142 and a non-threaded hole 144. In this example, attachment module 140 may be attached to a shoe 130 with an appropriate attachment mechanism. In this example a bolt is used to attach attachment module 140 to a shoe 130. In other embodiments, a metal pin or a clip may be used, or other attachment devices or mechanisms as would be apparent to one of skill in the art based on the disclosure provided herein.

Figure 5:
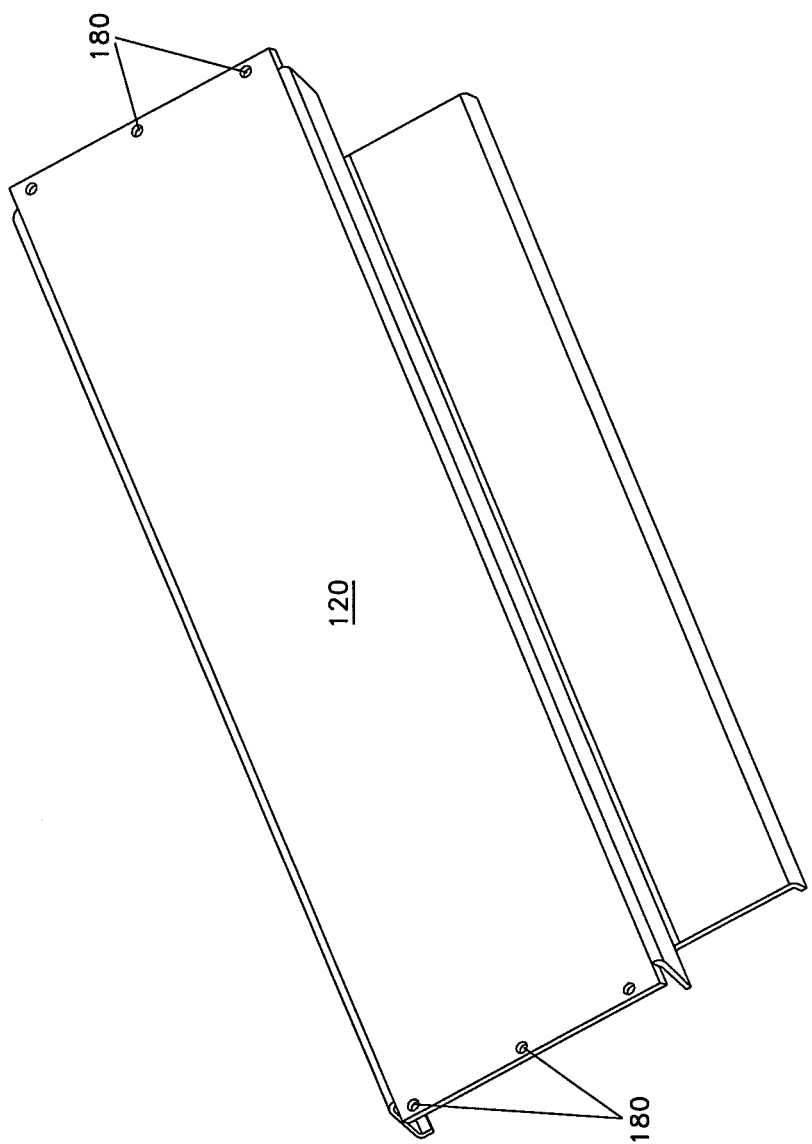
FIG. 5 is a deflector element of a solar module mounting system according to an aspect of the present inventions.

FIG. 5 is an isometric view of deflector 120. Deflector 120 can be made of metal, fiberglass, UV resistant plastic, concrete, or other suitable materials. In one embodiments, deflector 120 may be manufactured by cutting, bending, and galvanizing mild steel.

In this example, the deflector 120 includes a mechanism to facilitate attachment to a shoe 130. In this embodiment that mechanism includes three holes 180 along each side of deflector 120 for attachment to a shoe 130. In other embodiments, more holes may be provided in deflector 120 to provide for more secure attachment to shoe 130 and/or greater flexibility in positioning of deflector 120 on shoe 130. In other embodiments, fewer mounting holes may be provided in deflector 120.

The mounting holes 180 of deflector 120 (or any other mounting holes that may be a part of the mechanism for attachment) may be in the form of round holes, or in some embodiments, slots permitting sliding adjustments. In some embodiments, deflector 120 may include mounting tabs (not shown) extending from the sides of deflector 120 in which mounting holes 180 may be located. Mounting tabs in which the mounting holes are located may be offset from one another on either side of deflector 120 so that two deflectors can be mounted side by side utilizing a plurality of collinear holes 170 on a single link 310 of a shoe 130 so that the tabs of one deflector 120 do not interfere with the tabs of the other deflector 120.

Figure 6:
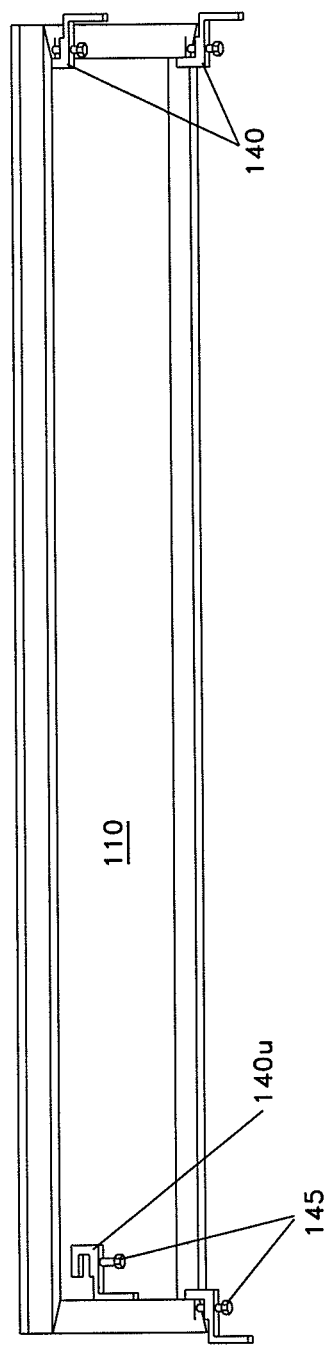
FIG. 6 is a view from the rear underside of a solar panel module illustrating attachment modules mounted on the solar panel module according to an aspect of the present inventions.
Figure 7:
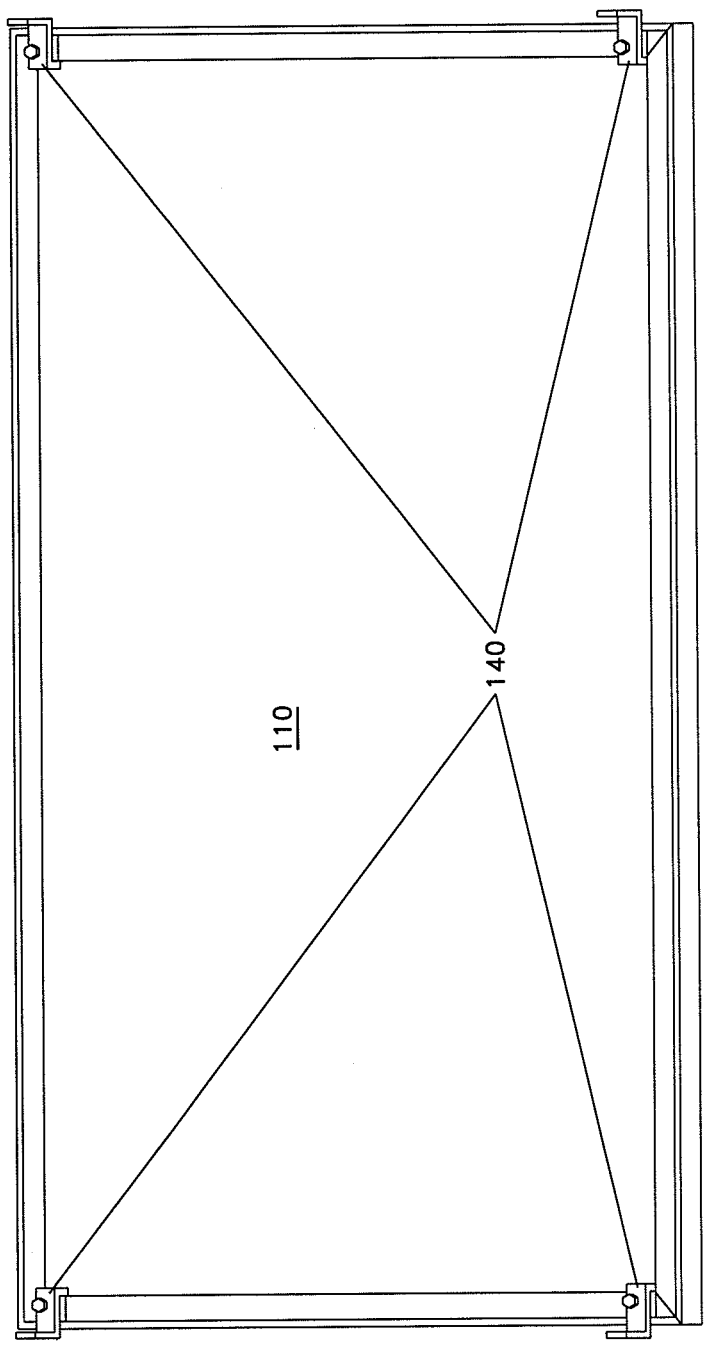
FIG. 7 is a view from underneath a solar panel module illustrating attachment modules mounted on the solar panel module according to an aspect of the present inventions.
Figure 8:
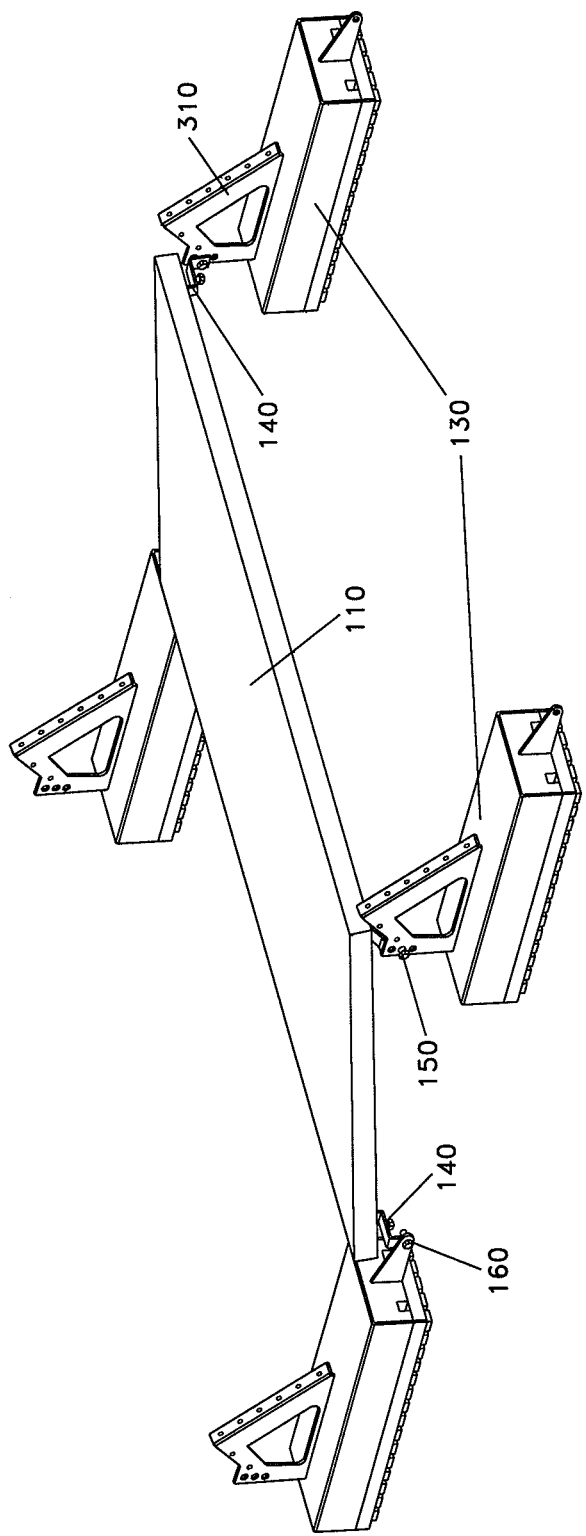
FIG. 8 is an isometric view of a solar panel module mounted to shoe elements according to an aspect of the present inventions.

FIGS. 6-8 illustrate one example of how attachment modules 140 may be utilized to attach solar panel modules 110 to shoe 130. FIG. 6 illustrates a solar panel module with three attachment modules 140 attached and one attachment module 140u unattached. As illustrated in FIGS. 6-8 an attachment module 140 may be attached to a solar panel module 110 by a threaded bolt 145 passing through a threaded hole in attachment module 140 to secure attachment module 140 to an inner edge of solar panel module 110. This provides for positioning and alignment of solar panel module 110 relative to shoe 130. Attachment modules 140 may be attached through non-threaded holes to shoe 130 by bolts passing through one of rear mounting holes 150 and forward mounting hole 160 for a rear and a forward attachment module 140 respectively. In this manner, solar panel modules 110 may be secured in place relative to shoe 130 and relative to one another in a fashion compatible with a number of commercially available solar panels. Other configurations may be designed to permit compatibility with multiple panel types whether attaching at this portion of the solar panel or designed for integration with future solar panels, based on the disclosure provided herein.

Figure 9:
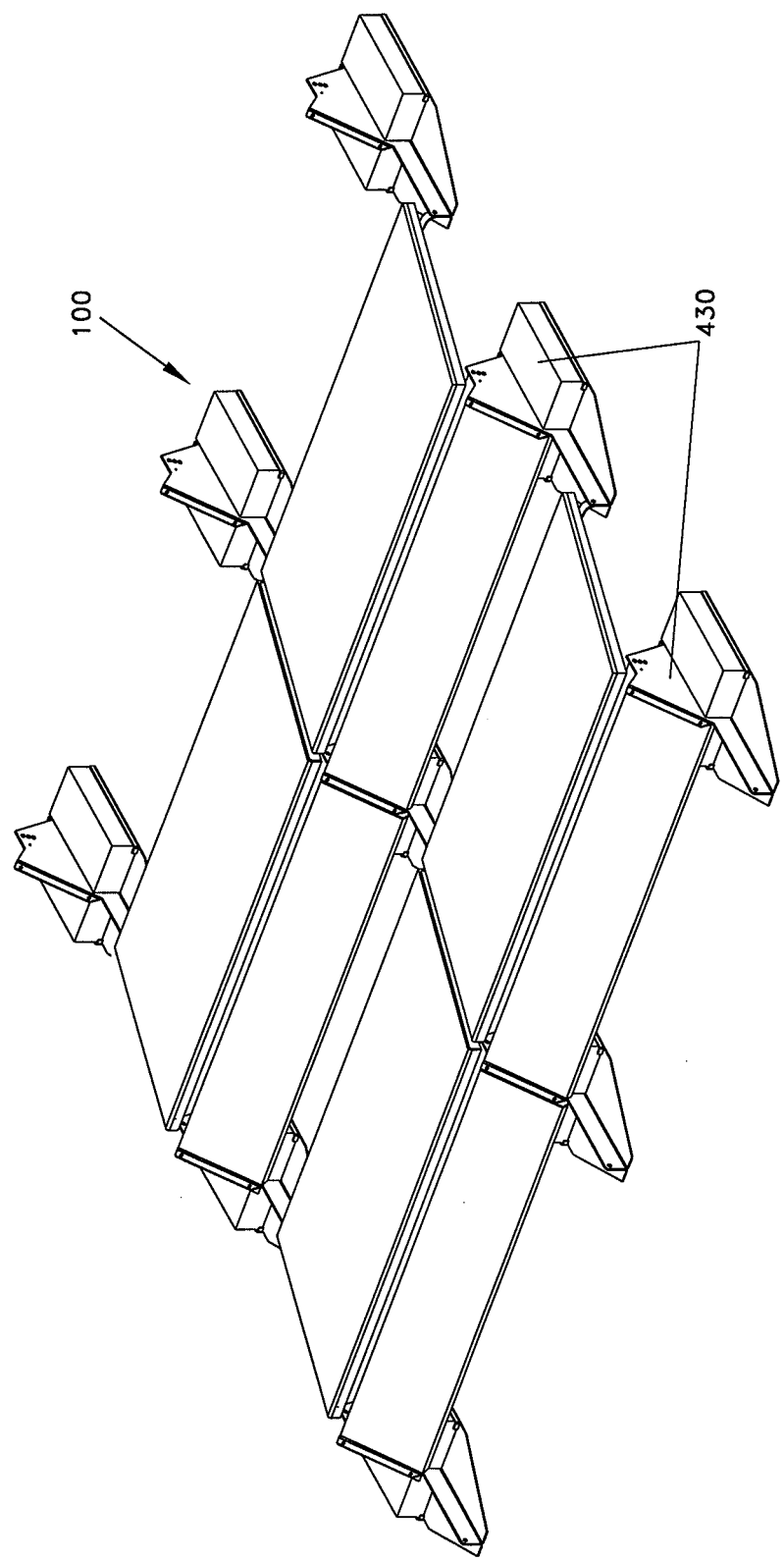
FIG. 9 is an array of solar panel modules according to another aspect of the present inventions.
Figure 10:
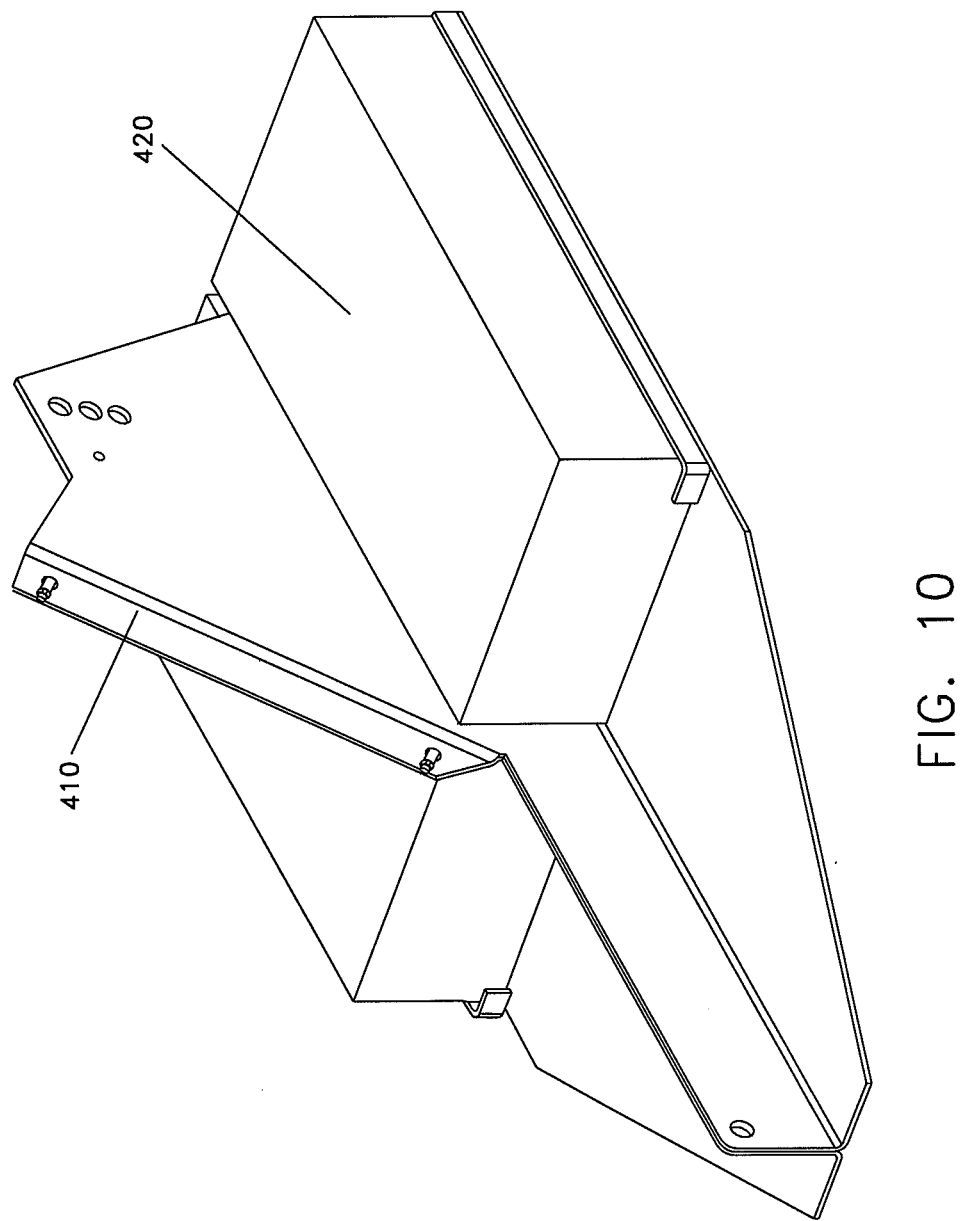
FIG. 10 is isometric view of a shoe element of a solar module mounting system according to another aspect of the present inventions.

FIG. 9 illustrates an array 100 of solar panel modules 110 with another embodiment of a shoe, e.g. shoe 430. Shoe 430 is illustrated in greater detail in FIG. 10. As illustrated in FIG. 10, shoe 430 may comprise multiple ballast elements 420. Illustrated in FIG. 10 is a shoe 430 with two similar sized ballast elements 420, one on each side of link 410. In this example, the link 410 is comprised of two pieces (a left and right side piece) as described below. The ballast elements may rest on link platform 415 illustrated in FIG. 11. In some embodiments, ballast elements 420 may be held in place on link platform 415 by forward retaining tab 415a, rear retaining tab 415b, and side retaining tab 415c. In some embodiments one or more of these tabs may be connected to one or more other of these tabs. In some embodiments, more or fewer retaining tabs may be present. In another embodiment, ballast elements 420 may additionally or alternatively be secured to link platform 415 by an adhesive, or by a fastener or fasteners such as, for example, screws or bolts.

Ballast elements 420 may in some embodiments comprise similar materials as ballast element 320 described above. In some embodiments, ballast elements 420 may comprise standard size concrete blocks, such as, for example, blocks with dimensions of 8 inches wide×8 inches tall×16 inches long, which may be available at numerous home improvement and/or building supply stores. Where the links are designed to permit use with standard sized, commercially available blocks, the need to ship heavy ballast elements along with other elements of the system may be reduced (although one could ship the ballast elements or design ballast element specifically for use with links 410). A purchaser/installer of the system could purchase the ballast blocks locally.

Although two similarly size ballast elements 420 are illustrated in FIG. 10, it is to be understood that alternate embodiments may include left and right and/or front and back ballast elements having different configurations, multiple ballast elements on each side, or a single ballast element. If more than two ballast elements are utilized, these ballast elements may comprise, for example, standard sized building materials, including, for example, standard sized bricks with dimensions of 3⅝ inches wide×2¼ inches high×8 inches long. If more than two ballast elements are used, they may be mounted on link platform 415 in a stacked or a side-by-side configuration, or both.

Figure 11:
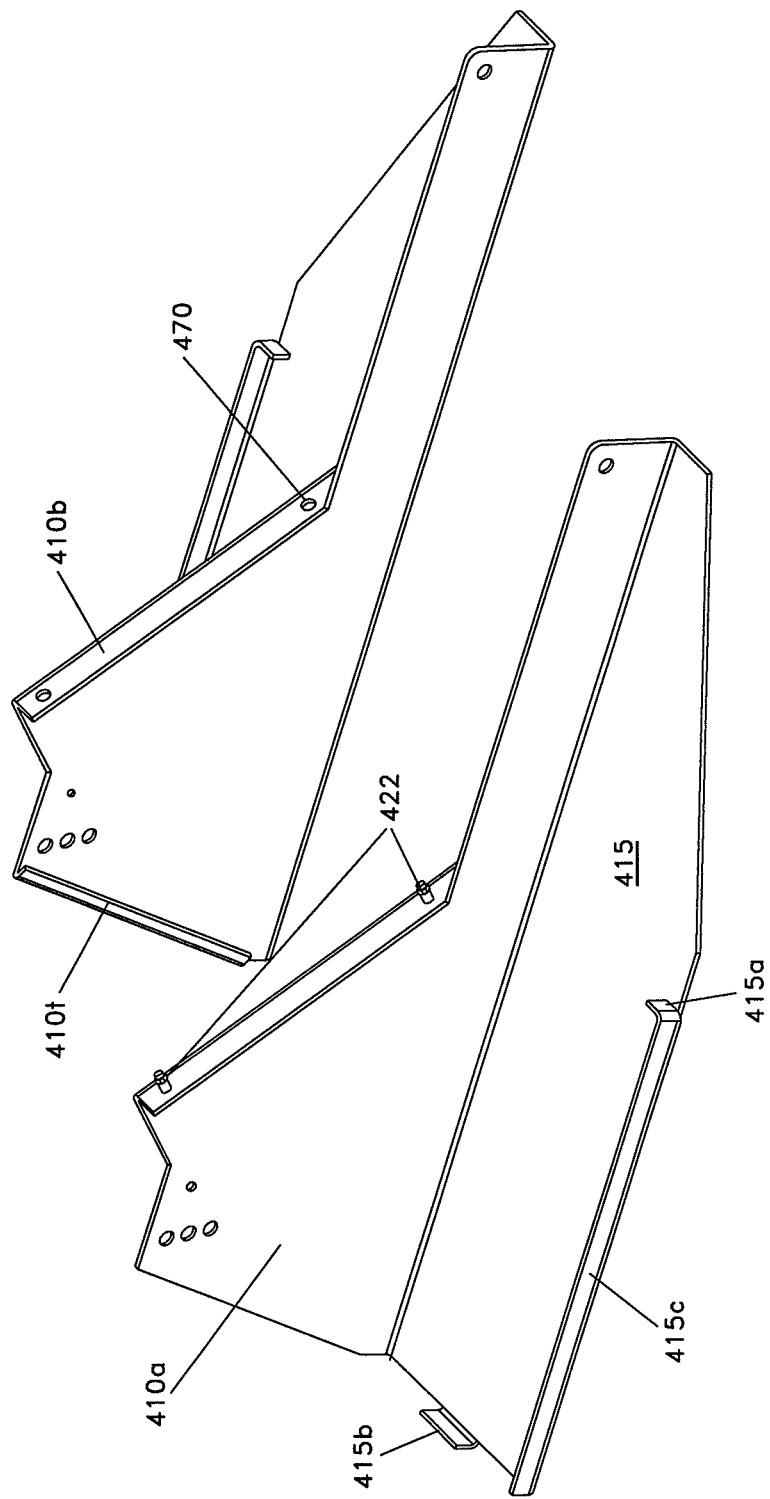
FIG. 11 illustrates a disassembled link member of a solar module mounting system according to another aspect of the present inventions.

Link 410 may be a single integral unit, or multiple units. As illustrated in FIG. 11, for example, link 410 may comprise two sides 410a and 410b. In this example, the sides include a mechanism for attaching the sides to each other. In this embodiment, the sides may be joined together by, for example, connectors 422 and tab 410t. Connectors 422 on link side 410a may fit though holes 470 in link side 410b. Tab 410t may fit about a rear portion of link side 410a. Connectors 422 may pass through holes 470 in link side 410a or may be bonded to link side 410a by means of, for example, welding or soldering. Connectors 422 may be, for example, bolts, pem nuts, or other connectors known in the art. In this example, once connectors 422 are passed through holes 470 in link side 410b, a securing element, such as, for example, a nut or a pin may be coupled to connectors 422 to secure link side 410a to link side 410b.

Figure 12:
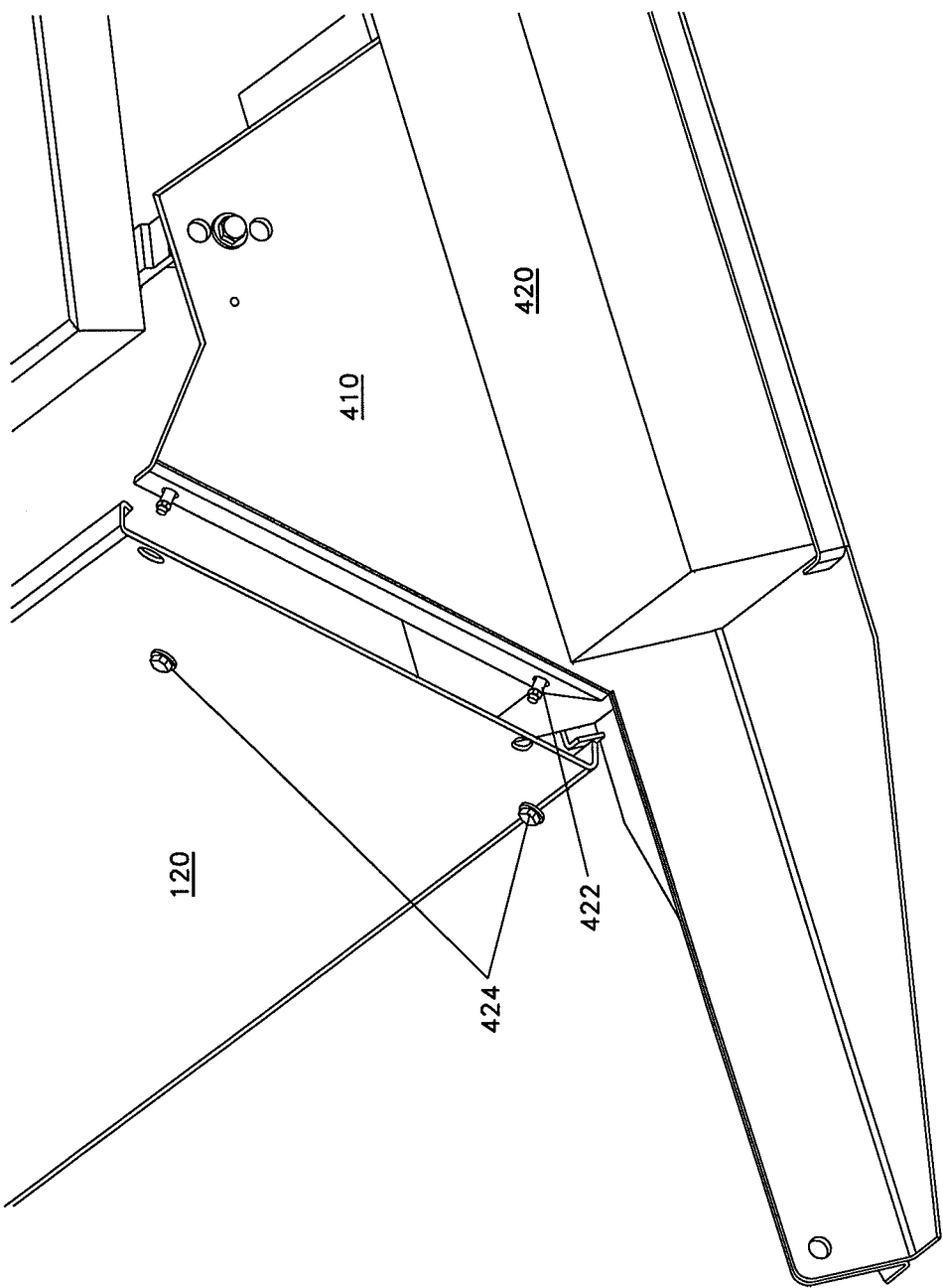
FIG. 12 illustrates connection of a deflector to a link member of a solar module mounting system according to another aspect of the present inventions.

FIG. 12 illustrates how a deflector 102 may be attached to shoe 430. In this example, link sides 410a and 410b are joined, and connectors 422 protrude from holes 470. A deflector 120 is then placed on link 410 such that connectors 422 extend through holes in the deflector. A securing element, in this example nut 424, is then used to secure the deflector to link 410 by way of connectors 422.

In another embodiment, tabs on a first side 410b of link 410 may be positioned into and slid into place into holes or slots in link side 410a in order to join sides 410a and 410b. In other embodiments, tabs and/or holes and/or slots may be provided on either or both of sides 410a and 410b. Alternatively, sides 410a and 410b could be joined by welding, by an adhesive, by fasteners such as screws or bolts, or by other fastening methods known in the art. This may be done in advance or at the time of installation.

Link sides 410a and 410b may each comprise a mechanism or mechanisms to facilitate in mounting of deflectors. In some embodiments, the mechanism includes a number of deflector mounting holes 470. Link 410 may comprise 3 deflector mounting holes on one or both of sides 410a and 410b, or in other embodiments may comprise fewer or greater numbers of deflector mounting holes 470. Deflector mounting holes 470 on side 410a may be aligned or offset from deflector mounting holes 470 on side 410b. If the deflector mounting holes 470 on link sides 410a and 410b are aligned with each other, deflectors 120 may be mounted to link 410 which have mounting tabs and/or holes which are aligned on either side of the deflector 120. A side of one deflector 120 may be attached to link side 410a while a side of another deflector 120 may be attached to link side 410b.

Link 410 may comprise a pad or sole (not shown) on its underside. This pad or sole may be made from similar materials as described above with reference to sole 330.

Figure 13:
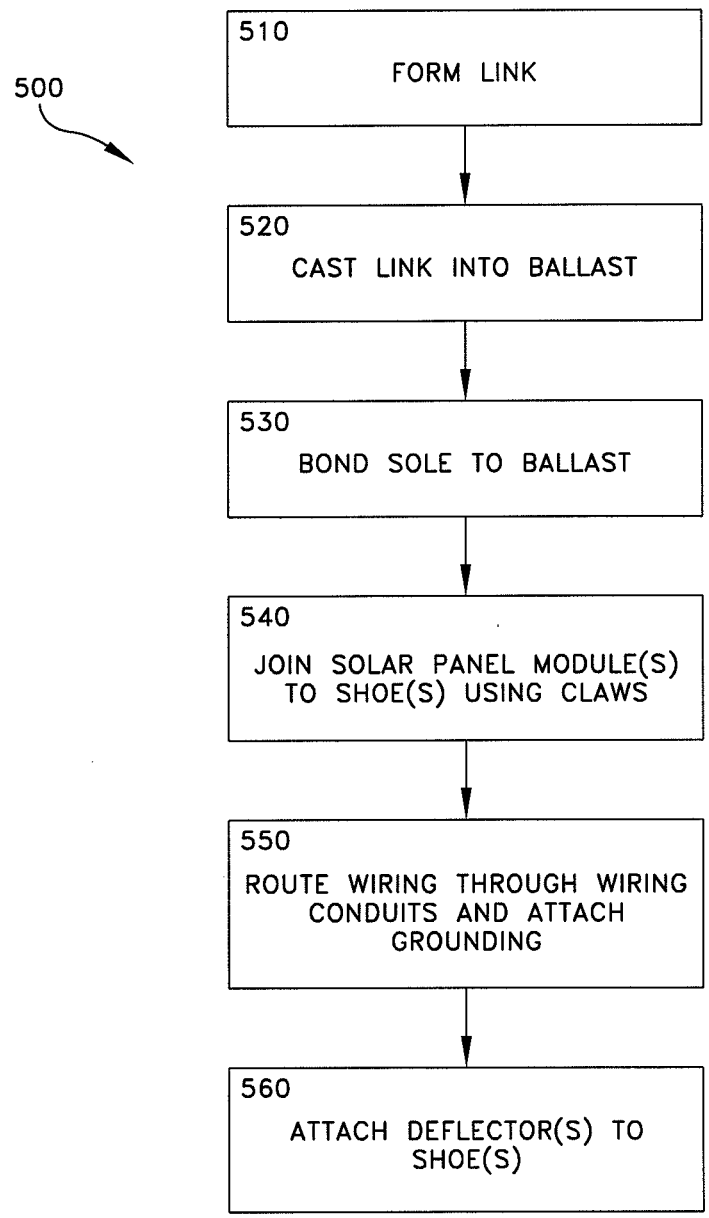
FIG. 13 is a flowchart of a method of forming a solar module integration system according to an aspect of the present inventions.

Referring to FIG. 13, there is illustrated a flowchart 500 of a method of forming a solar module integration system according to an aspect of the present inventions. In act 510 a link 310, 410 is formed. Link 310, 410 may be made from metals such as stainless steel, mild steel, or aluminum, UV resistant plastic, fiberglass, concrete, or other materials. In some embodiments, link 310, 410 may be made from 0.075 inch thick cold rolled mild steel. The mild steel may be cut, bent into the shape of link 310, 410, and hot-dip galvanized. In other embodiments, link 310, 410 may be extruded. In embodiments of link 310 similar to that illustrated in FIG. 4, link 310 may be formed as a single piece. In embodiments of link 410, similar to that illustrated in FIG. 11, the link 410 may be fabricated as two separate pieces 410a and 410b that are later joined. Rear mounting hole or holes 150, forward mounting hole or holes 160, deflector mounting hole or holes 170, and grounding attachment hole 180 may formed in link 310, 410 by for example, drilling or punching.

In act 520 the link 310, 410 is joined to a ballast 320, 420. Ballast 320, 420 may be formed from, for example, poured, dry cast, wet cast, or hydraulically pressed concrete, recycled rubber, polymer concrete, or other materials. Ballast 320, 420 may be bought off the shelf from a hardware or building supply store. In embodiments utilizing a link 310 similar to that illustrated in FIG. 4, the link 310 may be placed into a mold in which ballast 320 may be formed, thereby casting link 310 directly into ballast 320. Alternatively, ballast 320 may be formed with a slit cut for link 310 to be mounted into and link 310 may be mounted in this slit and secured using, for example, an adhesive or a fastener or fasteners such as screws or bolts. In embodiments utilizing a link 410 similar to that illustrated in FIG. 11, ballast or ballasts 420 may be secured to link platform 415 by forward retaining tab 415a, rear retaining tab 415b, and side retaining tab 415c. In other embodiments, ballast elements 420 may additionally or alternatively be secured to link platform 415 by an adhesive, or by a fastener or fasteners such as, for example, screws or bolts. Ballast 320, 420 may include one or more wire chases 340. These wire chases 340 may be molded into the ballast 320, 420, cut into the ballast after it is formed, or may be formed by casting a ½" diameter (or greater) piece or pieces of PVC pipe or other material into the ballast 320, 420 during the manufacture thereof.

In act 530, a sole 330 is attached to ballast 310. This act may be performed in embodiments utilizing a link similar to link 310 and a ballast 320 that has an exposed lower surface that may be at least partially covered by sole 330. In some embodiments, act 530 may be performed concurrently with act 520 wherein a sole 330 with extending fingers or other elements and/or intruding holes or recesses may be bound to ballast 310 by casting ballast 320 about the extending fingers or other elements and/or into the intruding holes or recesses. In other embodiments, sole 330 may be adhered to ballast 320 using an adhesive such as, for example, an epoxy, or by mechanical fasteners such as, for example, screws or bolts. The sole 330 may be formed from any material that can be considered an "inert pad" by the roofing industry. In some embodiments sole 330 may be made from recycled, non-vulcanized crumb rubber available from Unity Creations Ltd. of Hicksville, N.Y. In other embodiments sole 330 may be made from natural rubber or EPDM. In further embodiments, sole 330 may be formed of rubber or other material sprayed or deposited in liquid form onto ballast 310.

In embodiments where a link similar to link 410 is utilized and a sole is not desired to be attached to ballast 420 on an exposed on a lower surface, act 530 may be replaced by an act in which a sole 330 is bound to at least part of a lower surface of link 410. The sole 330 utilized in these embodiments may be formed of similar materials as the sole in embodiments where the sole is bound to a ballast 310. In embodiments where a link similar to link 410 is utilized, sole 330 may be bound to a lower surface of link 410 using an adhesive, such as for example, epoxy, using fasteners such as, for example, screws or bolts, or may be sprayed or melted onto a lower surface of link 410. Lower surface of link 410 may comprise holes, extrusions, or roughened areas (not shown) to facilitate the adherence of sole 330 thereto.

In act 540, the completed shoes 130, 430 are arranged on a roof or other mounting surface and solar panel modules 110 are attached thereto. Solar panel modules 110 may be attached to shoes 130, 430 utilizing attachment modules 140, as is illustrated in FIGS. 6-8 or may be joined to shoes 130, 430 using other fasteners or mechanisms known in the art. In instances where a mounting surface is not entirely level, solar panel modules 110 may be attached to different rear mounting holes 150 and/or different forward mounting holes 160 on different shoes in order to maintain the solar panel modules 110 in alignment with and/or at a similar horizontal level as adjacent solar panel modules 110. In some embodiments, additional stabilizing members, such as, for example, metal rails (not shown) may interconnect shoes 130. This may impart an increased rigidity to the solar panel module array. In some embodiments, shoes 130 may be mechanically attached to the roof or other mounting surface upon which they are mounted.

In act 550, wiring supplying power from solar panel modules 110 may be routed through wire chases 340 in ballasts 320, 420 and grounding wires may be attached to grounding terminal or hole 180. In some embodiments, shoe 130, 430 may be provided to an installation site with power and ground wires previously installed in wire chases 340.

In act 560, deflectors 120 may be attached to shoes 130, 430. Deflectors 120 may be adjustably mounted to shoes 130, 140 by the selection of appropriate mounting holes 170 on shoes 130, 430, or in some embodiments by aligning slot shaped mounting holes in deflector 120 to mounting holes 170. Deflectors 120 may in some embodiments be mounted to shoes 130, 430 such that upper edges of the deflectors are aligned with upper edges 210 of solar panel modules 110.

It is to be appreciated that acts 510-560 of flowchart 500 may in some embodiments be performed in alternate orders. It is also to be appreciated that not all acts need be performed in all embodiments, and that in some embodiments additional or alternate acts may be performed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for mounting an array of substantially flat solar panel modules on a surface, each solar panel module comprising a top edge, a bottom edge, a left edge, a right edge, and four corner portions, the system comprising:
   a plurality of link members configured to support the array; the system further comprising a plurality of attachment modules, wherein each corner portion of each of the solar panel modules is directly attached by a respective one of the attachment modules to a respective one of the link members;
   wherein each link member comprises:
      an elongated platform portion adapted to rest on the surface and receive the weight of one or more ballasts;
      a fin-shaped link portion extending from the platform portion along the length of the platform portion and in a direction away from the surface and substantially perpendicular to the platform portion and comprising:
         a first attachment facility comprising a plurality of first attachment points located at different heights above the surface and adapted for attaching a first respective one of the solar panel modules to one of the first attachment points at a first height above the surface; a second attachment facility comprising a plurality of second attachment points located at different heights above the surface and adapted for attaching a second respective one of the solar panel modules to one of the second attachment points at a second height above the surface which is different from the first height;
   wherein each attachment module comprises:
      a first section with a first surface;
      a second section with a second surface, the second section coupled to the first section, the first surface spaced from the second surface;
      a first fastener for retaining a portion of a solar panel module between the first surface and the second surface;
      a second fastener for directly fastening a respective one of the attachment modules to a respective one of the attachment facilities.

2. The system of claim 1, wherein, when assembled, for at least one of the link members:
   the first attachment facility is attached by a respective one of the attachment modules to the left edge of the first respective one of the solar panel modules at a corner portion more adjacent the top edge than the bottom edge of the first respective one of the solar panel modules;
   the second attachment facility attached by a respective one of the attachment modules to the left edge of the second respective one of the solar panel modules at a corner portion more adjacent the bottom edge than the top edge of the second respective one of the solar panel modules;
   the first attachment facility is attached by a respective one of the attachment modules to the right edge of a third respective one of the solar panel modules at a corner portion more adjacent the top edge than the bottom edge of the third respective one of the solar panel modules; and
   the second attachment facility is attached by a respective one of the attachment modules to the right edge of a fourth respective one of the solar panel modules at a corner portion more adjacent the bottom edge than the top edge of the fourth respective one of the solar panel modules.

3. The system of claim 2, further comprising:
   a plurality of wind deflectors, each wind deflector extending between a respective pair of link members.

4. The system of claim 1, wherein at least one attachment module comprises a threaded hole in at least one of the first and second surfaces configured to receive the first fastener.

5. The system of claim 1, wherein the platform portion of at least one link member comprises a ballast retention tab.

6. The system of claim 1, wherein at least one link member comprises a sole coupled to the underside of the platform portion.

7. The system of claim 1, further comprising a wire chase.

8. The system of claim 1, wherein the link member further comprises a grounding attachment.

9. A system for mounting an array of substantially flat solar panel modules on a surface, each solar panel module comprising a top edge, a bottom edge, a left edge, a right edge, and four corner portions, the system comprising:
   a plurality of link members each embedded in a respective ballast configured to support the array; the system further comprising a plurality of attachment modules, wherein each corner portion of each of the solar panel modules is directly attached by a respective one of the attachment modules to a respective one of the link members;
   wherein each link member comprises:
      a fin-shaped link portion extending from the respective ballast in a direction away from and substantially perpendicular to the surface and comprising:

a first attachment facility comprising a plurality of first attachment points located at different heights above the surface and adapted for attaching a first respective one of the solar panel modules to one of the first attachment points at a first height above the surface; a second attachment facility comprising a plurality of second attachment points located at different heights above the surface and adapted for attaching a second respective one of the solar panel modules to one of the second attachment points at a second height above the surface which is different from the first height;

wherein each attachment module comprises:
  a first section with a first surface;
  a second section with a second surface, the second section coupled to the first section, the first surface spaced from the second surface;
  a first fastener for retaining a portion of a solar panel module between the first surface and the second surface;
  a second fastener for directly fastening a respective one of the attachment modules to a respective one of the attachment facilities.

10. The system of claim 9, wherein, when assembled, for at least one of the link members:
  the first attachment facility is attached by a respect one of the attachment modules to the left edge of the first respective one of the solar panel modules at a corner portion more adjacent the top edge than the bottom edge of the first respective one of the solar panel modules;
  the second attachment facility attached by a respect one of the attachment modules to the left edge of the second respective one of the solar panel modules at a corner portion more adjacent the bottom edge than the top edge of the second respective one of the solar panel modules;
  the first attachment facility is attached by a respect one of the attachment modules to the right edge of a third respective one of the solar panel modules at a corner portion more adjacent the top edge than the bottom edge of the third respective one of the solar panel modules; and
  the second attachment facility is attached by a respect one of the attachment modules to the right edge of a fourth respective one of the solar panel modules at a corner portion more adjacent the bottom edge than the top edge of the fourth respective one of the solar panel modules.

11. The system of claim 10, further comprising:
a plurality of wind deflectors, each wind deflector extending between a respective pair of link members.

12. The system of claim 9, wherein at least one attachment module comprises a threaded hole in at least one of the first and second surfaces configured to receive the first fastener.

13. The system of claim 9, wherein each respective ballast comprises a concrete block formed around an embedded portion of a respective link member.

14. The system of claim 9, comprising a sole coupled to each respective ballast.

15. The system of claim 9, further comprising a wire chase extending through each respective ballast.

16. The system of claim 10, wherein each link member further comprises a grounding attachment.

17. The system of claim 1, wherein the fin-shaped link portion extends from a center line of the platform portion to define two ballast receiving portions that are substantially symmetric with each other about the link portion.

18. The system of claim 17, wherein the fin shaped link portion comprises a tab defining a substantially flat surface for receiving a wind deflector.

19. The system of claim 18, wherein the tab comprises one or more post members.

20. The system of claim 1, wherein the fin-shaped link portion comprises a leading edge and a trailing edge, and wherein the first attachment facility is located more proximal to the trailing edge than the leading edge and the second attachment facility is located more proximal to the leading edge than the trailing edge.

21. The system of claim 20, wherein the first and second attachment facilities each comprise one or more holes extending through the fin-shaped link portion.

22. The system of claim 9, wherein the fin-shaped link portion comprises:
  a first portion comprising the first attachment facility that extends from a top surface of the respective ballast;
  a second portion comprising the first attachment facility that extends from a side surface of the respective ballast.

23. The system of claim 22, wherein the fin shaped link portion comprises a tab defining a substantially flat surface for receiving a wind deflector.

24. The system of claim 23, wherein the tab comprises one or more post members.

25. The system of claim 9, wherein the fin-shaped link portion comprises a leading edge and a trailing edge, and wherein the first attachment facility is located more proximal to the trailing edge than the leading edge and the second attachment facility is located more proximal to the leading edge than the trailing edge.

26. The system of claim 25, wherein the first and second attachment facilities each comprise one or more holes extending through the fin-shaped link portion.

27. The system of claim 9, wherein the fin-shaped link portion comprises one or more holes, wherein each respective ballast is comprised of ballast material, wherein the fin-shaped link portion is cast in the respective ballast such the ballast material extends through and fills the holes.

* * * * *